UNITED STATES PATENT OFFICE 2,503,207

CHLORO-ARYLOXY ALKANES

Clarence L. Moyle, Clare, Mich., assignor to The Dow Chemical Company, Midland, Mich., a corporation of Delaware No Drawing. Application September 18, 1946, Serial No. 697,831

4 Claims. (Cl. 260—613)

This invention is directed to new compounds characterized as chloro-aryloxy alkanes, having the formula:

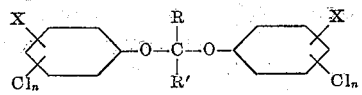

wherein R and R' represent hydrogen or a lower alkyl radical, X is hydrogen or phenyl, and $n$ is the integer 1 or 2. The expression "lower alkyl" refers to alkyl radicals containing not more than 5 carbon atoms and preferably 1 or 2 carbon atoms. The compounds are useful as modifiers in plastic compositions, as parasiticides and as intermediates for the preparation of more complex compounds. The compounds are liquids or solids, almost insoluble in water but somewhat soluble in many organic solvents.

The compounds of the invention may be prepared by reacting a salt of a chloro-phenol with a dihalomethane or higher dihaloalkane having both halogen substituents attached to the same carbon atom, e. g., 1.1-dichloro-ethane, 1.1-dibromoethane, 1.1-dichloropropane, 2.2-dichloropropane, etc. Conveniently the sodium salt of the chloro-phenol is employed, which may be prepared by reacting equimolecular proportions of sodium and the chloro-phenol in a solvent, such as ethanol or toluene. To this is then added a one-half molecular proportion of the dihaloalkane, and the mixture is then heated under autogenous pressure to a temperature between about 80° and 150° C. until reaction is complete. The reaction mixture is then cooled, washed with water, and treated in usual manner to recover the product, e. g., by distillation or by crystallization from solvents.

Example 1

46 grams (2 mols) of sodium was dissolved under reflux in 500 grams of absolute alcohol. 326 grams (2 mols) of 2.4-dichlorophenol was added to the alcoholic solution to form the sodium salt of the phenol. 85 grams (1 mol) of dichloromethane was then mixed with the solution of the sodium phenolate and the mixture was heated in an autoclave at about 110° C. for 8 hours. The reactor and contents were then cooled and the reaction mixture was discharged into a body of water. The organic reaction product was separated from the water by extraction with benzene and the benzene extract was fractionally distilled under reduced pressure. There was obtained 149 grams of di-(2.4-dichlorophenoxy)-methane as a pale yellow solid melting at 96°–98° C., and boiling at 213°–216° C. at 6 mm. pressure. The formula is:

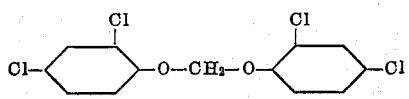

Example 2

23 grams of sodium was reacted with 128.5 grams of 4-chloro-phenol in 145 grams of methanol. 52 grams of 1.1-dichloroethane (ethylidene chloride) was added to the alcoholic phenolate solution and the resulting solution was heated at about 125° C. under autogenous pressure for 12 hours. The reaction mixture was then diluted with 400 grams of water and heated at atmospheric pressure to evaporate and recover the alcohol. 108 grams of an insoluble oil separated from the aqueous solution, which was washed successively with water and with dilute sulphuric acid. On fractional distillation of the oil there was obtained 35 grams of 1.1-di-(4-chloro-phenoxy)-ethane, boiling at 180°–184° C. at 4 mm. pressure. The formula is:

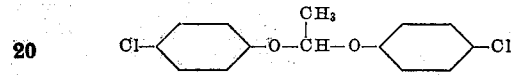

In similar manner di-(4-chloro-phenoxy)-methane was obtained from 4-chloro-phenol and dichloromethane, which is a pale yellow solid melting at 67°–69° C. and boiling at 189°–194° C. at 6 mm. pressure. The formula is:

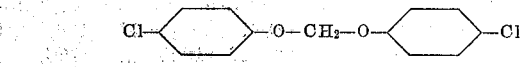

Di-(2-phenyl-6-chloro-phenoxy)-methane was prepared from 2-phenyl-6-chloro-phenol and dichloromethane, a white crystalline solid when crystallized from petroleum ether, melting at 92°–93.5° C. The formula is:

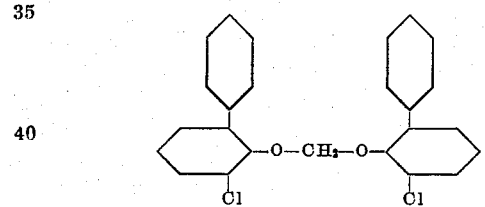

Other chloro-aryloxy alkanes within the scope of the invention are made by reacting a chlorophenolate with such alkylidene halides as 1.1-dichloropropane, 2.2-dichloropropane, 1.1-dichloro-n-butane, 2.2-dichloro-n-butane, 1.1-dichloro-2-methyl-propane, 1.1-dichloro-n-pentane, 1.1-dichloro-n-hexane, etc., and with the corresponding bromo-derivatives.

My new compounds have been found to possess a high degree of toxicity against many insect pests, and can be used in lethal concentrations without, or with negligible, injury to the foliage of plants to which the insecticidal compositions are applied. For use as an insecticide the compounds may be mixed with a finely-divided solid carrier as a dry mixture. Such mixture may be suspended in water, with the aid of a wetting agent, if desired, and the suspension applied in the form of a spray to the plants. Suitable concentration of the toxicant in such water suspensions is on the order of about 0.5 to 2 pounds per 100 gallons of the spray mixture. In particular, the new compounds have been found to be highly effective against Mexican bean beetle.

To demonstrate their toxicity, tests were made on third instar Mexican bean beetle and red spider adults. A dry mixture was prepared composed of 20 parts by weight of the toxicant and 80 parts of diatomaceous earth. The mixture was dispersed in water to form suspensions of different strength having a concentration, respectively, of 1.0, 1.5 and 2.0 pounds of the toxicant per 100 gallons of the spray, with 0.25 pound of sodium lauryl sulphate per 100 gallons added as dispersing agent. These spray mixtures were applied in usual manner for the control of the indicated plant pests with results as shown in the table:

| Toxicant | Concentration | Organism | Per Cent Foliage Injury | Kill |
|---|---|---|---|---|
| 1.1-di-(4-chlorophenoxy)-ethane | 2.0 | Mexican Bean Beetle (3rd instar) | 0 | 100 |
| Do | 1.5 | do | 0 | 100 |
| Do | 1.0 | do | 0 | 100 |
| Do | 2.0 | Red Spider (adult) | 0 | 100 |
| Di-(4-chlorophenoxy)-methane | 2.0 | Mexican Bean Beetle (3rd instar) | 0 | 100 |
| Do | 1.5 | do | 0 | 100 |
| Do | 1.0 | do | 0 | 75 |
| Do | 2.0 | Red Spider (adult) | 0 | 99 |

This application is a continuation-in-part of my prior application, Serial No. 441,377, filed May 1, 1942, now abandoned.

I claim:

1. A chloro-phenoxy alkane having the formula:

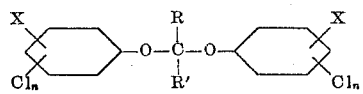

wherein R and R' each represent one of the group consisting of hydrogen and lower alkyl, X is one of the group consisting of hydrogen and phenyl, and $n$ is an integer from 1 to 2, inclusive.

2. Di-(2.4-dichloro-phenoxy)-methane.
3. 1.1-di-(4-chloro-phenoxy)-ethane.
4. Di-(4-chloro-phenoxy)-methane.

CLARENCE L. MOYLE.

REFERENCES CITED

The following references are of record in the file of this patent:

UNITED STATES PATENTS

| Number | Name | Date |
|---|---|---|
| 2,130,990 | Coleman | Sept. 20, 1938 |

OTHER REFERENCES

Birosel, "Philippine Jour. Science," vol. 34 (1927), pages 157–160, abstracted in Chem. Abs., vol. 22, (1928) page 766.

Tornow et al., "Ber. der. Deut. Chem. Ges.," vol. 62B (1929), pages 2844–2850.